United States Patent [19]

Shishikui et al.

[11] Patent Number: 5,534,927
[45] Date of Patent: Jul. 9, 1996

[54] METHOD OF PERFORMING HIGH EFFICIENCY CODING OF IMAGE SIGNAL AND SYSTEM THEREFOR

[75] Inventors: Yoshiaki Shishikui; Yukihiro Nishida; Eisuke Nakasu; Yoshimichi Ohtsuka; Hiroshi Nakanishi, all of Tokyo, Japan

[73] Assignee: Nippon Hoso Kyokai, Tokyo, Japan

[21] Appl. No.: 975,433

[22] Filed: Nov. 12, 1992

[30] Foreign Application Priority Data

Nov. 12, 1991 [JP] Japan ................................. 3-295602
Jan. 27, 1992 [JP] Japan ................................. 4-012118
Sep. 25, 1992 [JP] Japan ................................. 4-256739

[51] Int. Cl.$^6$ .............................. H04N 7/30; H04N 7/32
[52] U.S. Cl. ............................................. 348/400; 348/401
[58] Field of Search ........................................ 358/133, 135, 358/136; 348/384, 400, 401, 402, 409, 403, 404, 405, 411, 412; H04N 7/133, 7/137

[56] References Cited

U.S. PATENT DOCUMENTS

| | | | |
|---|---|---|---|
| 4,821,119 | 4/1989 | Gharavi ................................. | 358/133 |
| 4,829,378 | 5/1989 | Legall .................................. | 358/133 |
| 4,969,040 | 11/1990 | Gharavi ................................. | 358/135 |
| 4,999,705 | 3/1991 | Puri ..................................... | 358/136 |
| 5,021,879 | 6/1991 | Vogel ................................... | 348/402 |
| 5,057,918 | 10/1991 | Denuyelle et al. ...................... | 358/135 |
| 5,068,724 | 11/1991 | Krause et al. .......................... | 358/133 |
| 5,089,888 | 2/1992 | Zdepski et al. ......................... | 358/133 |
| 5,126,962 | 6/1992 | Chiang .................................. | 364/725 |
| 5,150,432 | 9/1992 | Ueno et al. ............................ | 382/56 |
| 5,159,448 | 10/1992 | Kojima ................................. | 358/135 |
| 5,196,933 | 3/1993 | Henot .................................. | 358/136 |
| 5,228,028 | 7/1993 | Cucchi et al. .......................... | 348/402 |

FOREIGN PATENT DOCUMENTS

0250152  12/1987  European Pat. Off. .

OTHER PUBLICATIONS

*IEEE Transactions on Circuits and Systems for Video Technology,* "Subband Coding Algorithms for Video Applications. Videophone to HDTV-Conferencing", H. Gharavi, vol. 1, No. 2, Jun. 1991, New York, New York.

*Tijdschrift Van Het Nederlands Elektronica-En Radiogenootschap,* "Twee-Dimensionale Beeld-Codering Door HetKombineren Van Een-Dimensionale Hadamard Transformatie En DPCM", De Brouwer, et al., vol. 39, No. 5-6, 1974.

*7th Hawaii International Conference on System Sciences,* "Picture Bandwidth Compression by CPCM in the Hadamard Transform Domain", Ishii, et al., Jan. 1974, Hawaii, HA.

(List continued on next page.)

*Primary Examiner*—Tommy P. Chin
*Assistant Examiner*—Vu Le
*Attorney, Agent, or Firm*—Antonelli, Terry, Stout & Kraus

[57] ABSTRACT

A system for performing high efficiency coding of an image signal includes a differential signal generating section, a processing section, a supply section, a coefficient train outputting section, and a code assigning section. The differential signal generating section generates a differential image signal between a current image signal inputted thereto and a prediction image signal inputted thereto for the current image signal with respect to a target block. The current image signal and the differential image signal each include a plurality of blocks and the target block is one of the plurality of blocks. The processing section executes processing of a one-dimensional orthogonal transform and a quantization for an inputted objective image signal, with respect to the target block, to generate the processing result as quantization coefficients. The supply section supplies the processing section with the differential image signal as the objective image signal with respect to the target block. The coefficient train outputting section generates a quantization coefficient train from the quantization coefficients. The code assigning section assigns a code to each quantization coefficient of the train to generate a transmission signal.

27 Claims, 10 Drawing Sheets

OTHER PUBLICATIONS

*Slaboproudy Obzor*, "Optimalizacia Jednorozmernych Hybridnych Kodovacich Systemov Obrazov", Mihalik, et al., vol. 4, No. 8, Aug. 1987, C2.

*IEEE Transactions on Electromagnetic Campatibility*, "Real–Time Hadamard Transform Coding for TV Signals", Jain, et al. vol. 23 No. 2, May 1981, NY, NY.

"A Study of Modeling of the Motion Compensation Prediction Error Signal", IEICE Trans. Commun., vol. E75–B, No. 5 May 1992.

"A Consideration on Coding of Motion Compensation Prediction Error Signal", ITEJ Technical Report vol. 16, No. 11, pp. 19–24 Jan. 31, 1992.

"A Study on Subband Coding for HDTV Signal Transmission", SAT 91–105, CS91–102, pp. 13–18, 1992.

"A Study on Sub–band DCT Coding for HDTV Signal Transmission", PCST89, pp. 83–84, Oct. 1989.

"A Study on Modeling of Motion Compensated Prediction Error".

"A Comparison Between Interfield and Interframe Motion Compensation".

"Intra/Inter Mode Adaphic Coding Scheme".

"Wavelet Transform Coding for Motion Picture", ITEC 91, pp. 327–328, 1991.

"Databook: TMC 2311", for TRW LSI Product Inc.

FIG. 8A

| 0 | 2 | 6 | 12 | 20 | 28 | 36 | 44 |
|---|---|---|----|----|----|----|----|
| 1 | 5 | 11 | 19 | 27 | 35 | 43 | 51 |
| 3 | 7 | 13 | 21 | 29 | 37 | 45 | 52 |
| 4 | 10 | 18 | 26 | 34 | 42 | 50 | 57 |
| 8 | 14 | 22 | 30 | 38 | 46 | 53 | 58 |
| 9 | 17 | 25 | 33 | 41 | 49 | 56 | 61 |
| 15 | 23 | 31 | 39 | 47 | 54 | 59 | 62 |
| 16 | 24 | 32 | 40 | 48 | 55 | 60 | 63 |

FIG. 8B

| 0 | 7 | 14 | 20 | 29 | 33 | 38 | 44 |
|---|---|----|----|----|----|----|----|
| 1 | 9 | 17 | 21 | 32 | 37 | 43 | 51 |
| 2 | 10 | 18 | 25 | 34 | 39 | 45 | 52 |
| 3 | 11 | 19 | 27 | 36 | 42 | 50 | 57 |
| 4 | 12 | 22 | 28 | 40 | 46 | 53 | 58 |
| 5 | 13 | 23 | 30 | 41 | 49 | 56 | 61 |
| 6 | 15 | 24 | 31 | 47 | 54 | 59 | 62 |
| 8 | 16 | 26 | 35 | 48 | 55 | 60 | 63 |

METHOD OF PERFORMING HIGH EFFICIENCY CODING OF IMAGE SIGNAL AND SYSTEM THEREFOR

BACKGROUND OF THE INVENTION

1. Field of the Invention

The present invention relates to a method of performing high efficiency coding of an image signal such as a video signal for a television and a system therefor, and more particularly, to a method and apparatus for performing optimal coding of the image signal depending upon the property thereof.

2. Description of the Related Art

Currently, a video signal for television, i.e., a TV signal is transmitted in an analog form. However, a digital transmission technique has being investigated and brought into practical use in a TV telephone system and so on. The digital transmission has features in that very few deterioration occurrences in quality is present in the midway of transmission and a long distance transmission is permitted. Also, a transmission path can be effectively utilized. For these reason, it is thought that the digitization of the transmission techniques will be advanced in future, and the transmission of the TV signal will also be digitized.

When the TV signal is concerned, however, an extremely large amount of information must be transmitted if it is digitized as it is and digitally transmitted, which requires a faster transmission apparatus, extension of the width of transmission paths and so on, thereby rendering the transmission cost too high and such digitization unrealistic.

When an image of a previous frame/field is compared with an image of a current frame/field, a different portion between them is often only very small fragments of them. In such a case, it is not efficient to repeatedly transmit image information of the same portion. If image information of the different portion alone is transmitted and an image of a current frame/field is produced from image information of a previous frame/field and the image information of the different portion, the amount of information to be transmitted can be reduced. The time-wise redundancy can thereby be eliminated in the transmission of the image signal. Also, assignment of a same code to each of adjacent pixels having substantially the same amplitude in the image signal for a frame/field portion results in wasting the information capacity. If the number of codes or the number of bits of codes assigned to these pixels can be reduced, the transmission efficiency can be improved. In other words, the spatial redundancy can be removed from an image signal. Thus, a conventional high efficiency coding system 100 for an image signal, which can remove the time-wise and spatial redundancies, is shown in FIG. 1.

Referring to FIG. 1, a subtractor 101 generates a prediction error signal by calculating the difference between a current image signal and a prediction image signal. A controller 102 is supplied with the current image signal for one of a plurality of blocks and the prediction image signal to compare their power amounts, and generates a mode signal in accordance with the comparison result. The mode signal indicates an intra mode or an inter mode. A switch 103 operates in response to the mode signal, i.e., selects, as a signal to be processed, the current image signal in the intra mode and the prediction error signal in the inter mode and outputs the selected signal to a circuit 105 for two-dimensional discrete cosine transform (2D-DCT). The circuit 105 executes 2D-DCT processing to the signal to be processed to generate transform coefficients. The transform coefficients are quantized by a circuit (Q) 106. The quantization coefficients are supplied to a scanning circuit 107 and a dequantization circuit ($Q^{-1}$) 109. The quantization coefficients are scanned by the scanning circuit 107 in a zig-zag manner and read out as a train of coefficients to be supplied to a variable length coding circuit (VLC) 108. The VLC 108 codes the mode signal and each coefficient in the train and outputs them as a transmission signal. The quantization coefficients inversely quantized or dequantized by a circuit 109 go through inverse 2D-DCT processing executed by a circuit 110, whereby a signal to be inputted to the circuit 105 is substantially reproduced. The reproduced signal is supplied to an adder 111. A switch 104 operates in response to the mode signal such that it opens in the intra mode and closes in the inter mode to supply a signal from a predicting circuit 112 to the adder 111. As a result, the adder 111 outputs to the predicting circuit 112 the reproduced signal by the circuit 110 as a reproduced previous image signal for the next image signal in the intra mode, while reproduces a previous image signal for the next image signal from the reproduced signal as a prediction error signal and a previous image signal for the current image signal and outputs the previous image signal to the predicting circuit 112 in the inter mode. The predicting circuit 112 receives the next image signal, in addition to the reproduced previous image signal for the next image signal, generates a motion compensated signal from both signals, and outputs the motion compensated signal as the prediction image signal to the subtractor 101.

As described above, the conventional high efficiency coding system 100 removes the time-wise and spatial redundancies to some degree. However, when the output from the VLC 108 was examined, it was revealed that coding was not so efficiently carried out, or the redundancies were sometimes increased on the contrary.

SUMMARY OF THE INVENTION

The present invention has been made in view of the above circumstance, and according to a first aspect of the present invention, there is provided a method of performing high efficiency coding of an image signal wherein one of two-dimensional orthogonal transform such as two-dimensional discrete cosine transform (2D-DCT) for a current image signal and one-dimensional orthogonal transform such as one-dimensional discrete cosine transform (1D-DCT) for a differential image signal between the current signal and a reproduced image signal is selectively employed.

According to a second aspect of the present invention, there is provided a method of performing high efficiency coding of an image signal wherein one of a current image signal and an error signal is selected in accordance with the power amount of the current image signal and the error signal, and one of two-dimensional orthogonal transform such as 2D-DCT, one-dimensional orthogonal transform such as 1D-DCT in the horizontal/vertical direction and no transform is selectively employed, for the selected signal, in accordance with the correlation between pixels in the vertical/horizontal direction of the selected signal.

According to a third aspect of the present invention, there is provided a method of performing high efficiency coding of an image signal in which a band division and a method of removing the time-wise and spatial redundancies are combined.

According to a fourth aspect of the present invention, there are provided systems for realizing the above respective methods.

BRIEF DESCRIPTION OF THE DRAWINGS

FIGS. 8A and 8B illustrate a scanning path according to CCIR Recommendation 723 and a scanning path according to the inter mode of the present invention;

DESCRIPTION OF THE PREFERRED EMBODIMENTS

A system for high efficiency coding of an image signal according to the present invention will hereinafter be described in detail with reference to the accompanying drawings.

Figure 1:
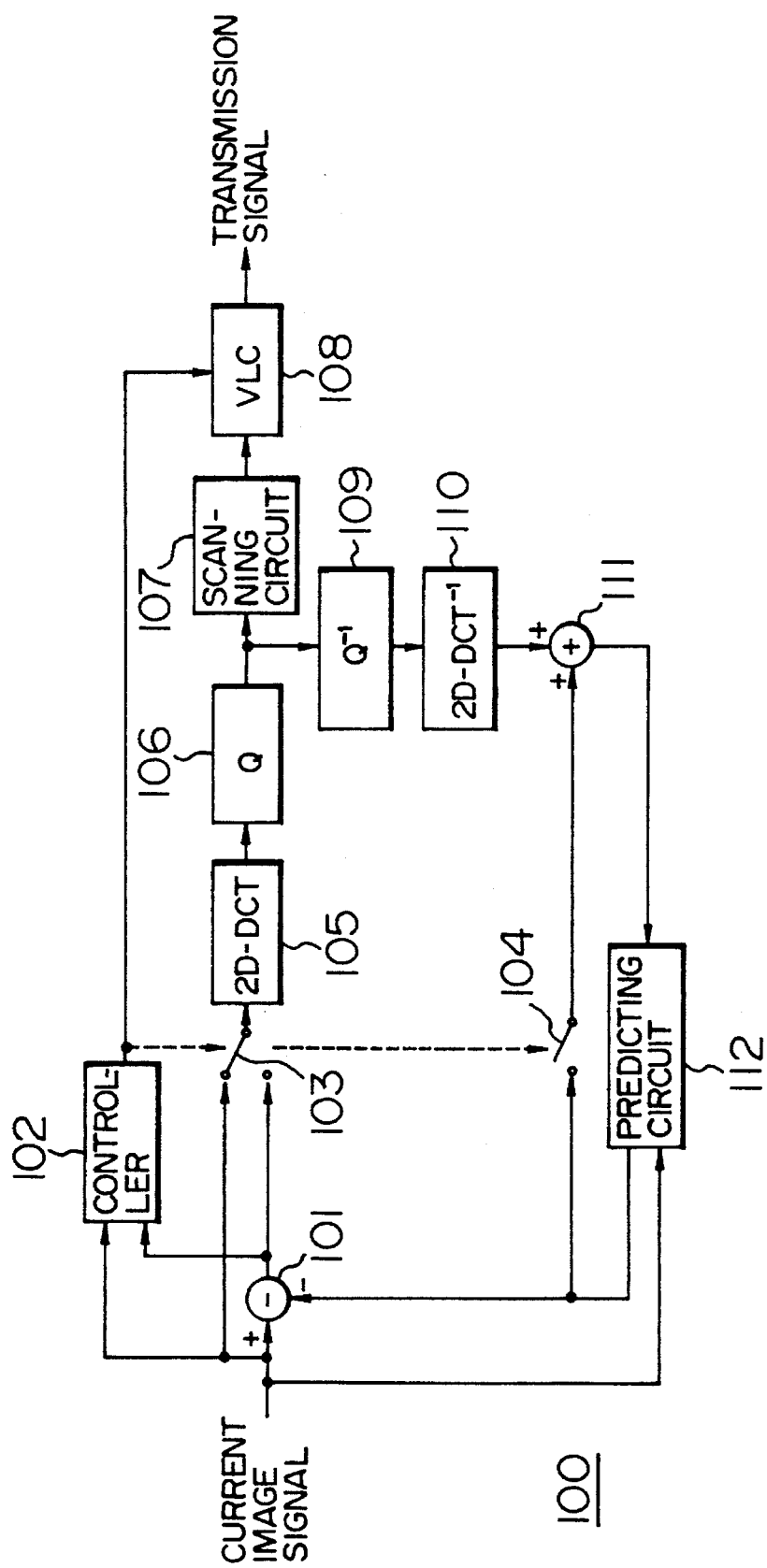
FIG. 1 illustrates a conventional system for performing high efficiency coding of an image signal.
Figure 2:
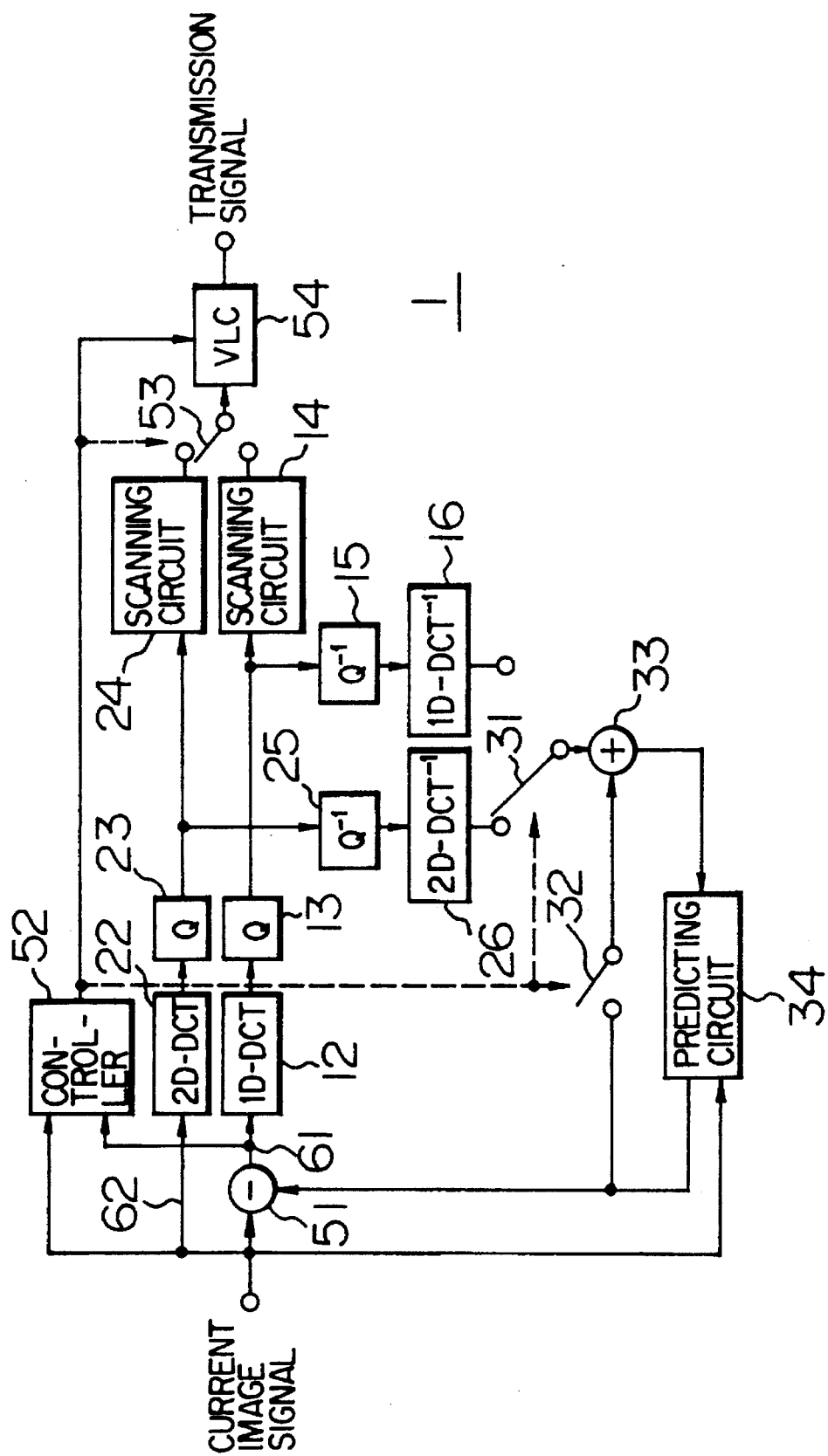
FIG. 2 illustrates a system for high efficiency coding of an image signal according to the present invention.

First, the configuration of a high efficiency coding system 1 according to an embodiment of the present invention will be explained with reference to FIG. 2. In FIG. 2, the coding system 1 includes a subtractor 51; a control section; a processing section including a one-dimensional processing section and a two-dimensional processing section; a variable length coder (VLC) section; and a reproducing section. The coding system receives sequentially previous, current and next image signals. The subtractor 51 derives a differential image signal, i.e., a prediction error signal, between the inputted current image signal and a reproduced previous image signal for the current image signal. A controller 52 in the control section is supplied with the current image signal and the differential image signal to generate a mode signal indicating either one of an inter mode and an intra mode. The one-dimensional processing section is supplied with the differential image signal as an objective image signal from the subtractor 51 through a path 61 and performs one-dimensional orthogonal transform processing for the differential image signal to generate a train of quantization coefficients. When the differential image signal is utilized for generating a transmission signal, this is called the inter mode. The two-dimensional processing section is supplied with the current image signal as an objective image signal through a path 62 and performs two-dimensional orthogonal transform processing for the current image signal to generate a train of quantization coefficients. When the current image signal is utilized as it is for generating a transmission signal, this is called the intra mode. The circuit 13 quantizes each transform coefficient from the 1D-DCT 12 with a weight predetermined based on the inter mode and the circuit 23 quantizes each transform coefficient from the 2D-DCT 22 with a predetermined based on the intra mode. The circuits 14 and 24 have scanning paths, respectively. A switch 53 of the VLC section is responsive to the mode signal from the controller 52 to select one of the trains of quantization coefficients from the one-dimensional and two-dimensional processing sections and supplies the selected train to a variable length coder (VLC) 54 of the VLC section. The VLC 54 is also supplied with the mode signal from the controller 52. The mode signal is first converted to a code word, and subsequently the selected train of quantization coefficients is converted to code words. However, the mode signal may be converted to the code word after the selected train. The converted code words are outputted onto a transmission path as the transmission signal. The reproducing section receives quantization coefficients from both of the one-dimensional and two-dimensional processing sections, reproduces the previous image signal for the current image signal and supplies the same to the subtractor 51.

The one-dimensional processing section includes a one-dimensional discrete cosine transform (1D-DCT) circuit 12; a quantizing circuit (Q) 13 and a scanning circuit 14. The 1D-DCT circuit 12 is supplied with a differential image signal, i.e., a prediction error signal for a predetermined size, e.g., a block of 8×8 pixels, and executes 1D-DCT processing as the one-dimensional orthogonal transform processing for the differential image signal per sub-block of eight pixels in the horizontal direction to generate transform coefficients. The horizontal direction refers to the scanning line direction in this example. The Q 13 quantizes the transform coefficients from the 1D-DCT circuit 12 with respective predetermined weight factors to generate 64 quantization coefficients for eight sub-blocks. The scanning circuit 14 scans the quantization coefficients of a one block, i.e., eight sub-blocks arranged in the vertical direction in a predetermined order to generate a train of quantization coefficients.

The two-dimensional processing section includes a two-dimensional discrete cosine transform (2D-DCT) circuit 22, a quantizing circuit (Q) 23 and a scanning circuit 24. The 2D-DCT circuit 22 is supplied with the current image signal for a block of predetermined size, e.g., of 8×8 pixels, directly executes 2D-DCT processing as the two-dimensional orthogonal transform processing for that block to generate transform coefficients. The Q 23 quantizes the transform coefficients from the 2D-DCT circuit 22 with respective predetermined weight factors to generate 64 quantization coefficients. The scanning circuit 24 scans the 64 quantization coefficients in a predetermined order to generate a train of quantization coefficients.

The reproducing section includes the dequantizing circuits ($Q^{-1}$) 15 and 25; an inverse two-dimensional discrete cosine transform ($2D\text{-}DCT^{-1}$) circuit 26; an inverse one-dimensional discrete cosine transform ($1D\text{-}DCT^{-1}$) circuit 16; switches 31 and 32; an adder 33; and a predicting circuit 34. The $Q^{-1}$'s 15 and 25 respectively dequantizes the quantization coefficients from the Q's 13 and 23 to signals before the quantization. The $1D\text{-}DCT^{-1}$ circuit 16 and the $2D\text{-}DCT^{-1}$ circuit 26 respectively execute $1D\text{-}DCT^{-1}$ processing and $2D\text{-}DCT^{-1}$ processing for the signals from $Q^{-1}$'s 15 and 25 to reproduce the objective image signals. The switches 31 and 32 operate in response to the mode signal from the controller 52. Specifically, the switch 31 connects the adder 33 to the circuit 26 in the intra mode and to the circuit 16 in the inter mode. The switch 32 is opened in the intra mode and closed in the inter mode. The adder 33 adds the inversely transformed signal inputted from the circuit 16 or 26 through the switch 31 to a signal inputted from the predicting circuit 34 through the switch 32 to reproduce a signal. The reproduced signal is substantially equal to the inputted current image signal, however, strictly speaking, quantization processing errors may cause inequality between them. The reproduced signal is supplied to the predicting circuit 34. The predicting circuit 34 is also supplied with the current image signal and executes inter-field prediction/inter-frame prediction/motion compensation prediction. The predicting circuit 34 generates a prediction image signal obtained through the inter-field prediction/inter-frame prediction/motion compensation prediction and supplies this signal to the subtractor 51.

Next, explanation will be given of the operation of the high efficiency coding system according to the present invention. First, the spatial power spectrum of a prediction error signal will be considered. According to an article by one of the inventors of the present invention, Shishikui, entitled "A study on Modelling of Motion Compensated Prediction Error" (The Institute of Electronics, Information and Communication Engineers, IE 91–35, pp 13–20, Jul. 26, 1991), the spatial property of a motion compensated prediction error signal, which is largely different from the property of a first-order Marcov model which is used as a model of an image signal, has the following features:

1. Due to the high pass filter characteristic of the motion compensated prediction and differential process, the power spectrum of a motion compensated prediction error signal is fairly flat as compared with that of an inputted image signal. In other words, the correlation between pixels is very small.
2. While the power still tends to be concentrated in a low frequency region in the horizontal direction, a fairly flat characteristic is present in the vertical direction. This tendency is remarked by introducing a motion compensation with an precision in the order of decimal position. These are caused by the influence of inter-lace such as aliasing and phase reversal of an interpolated output in high frequency components.
3. The motion compensated prediction error signal as a whole has the spatial frequency characteristic largely different from that of the inputted image signal.

As will be apparent from the foregoing, the correlation between pixels in the horizontal direction is large but that in the vertical direction is small, with respect to the motion compensated prediction error signal in the interlace scanning. For this reason, even if the DCT processing is performed in the vertical direction, few redundancy can be efficiently removed due to the small correlation between pixels. In some cases, the DCT processing may result in increasing the redundancy on the contrary or inducing some artifact distinctive of DCT on the reproduced image. On the other hand, since the correlation between pixels is high in the horizontal direction, the DCT processing is worth executing. Therefore, in this embodiment of the present invention, a prediction error signal is subjected to horizontal 1D-DCT.

Figure 3A:
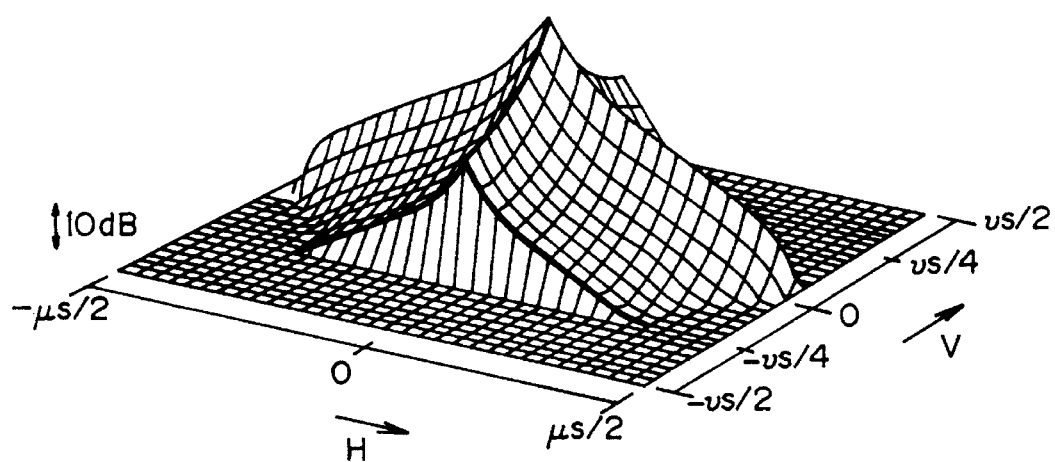
FIGS. 3A and 3B illustrate power spectra of a current image signal and a differential image signal in the system of FIG. 1.
Figure 3B:
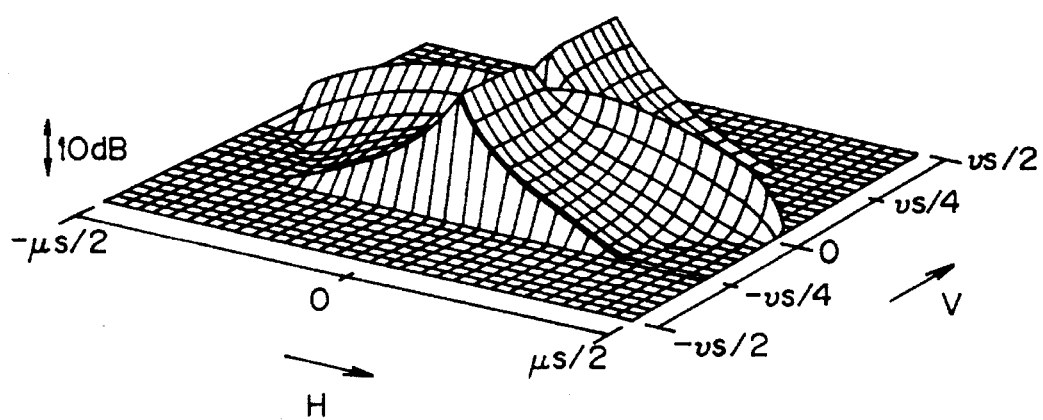
Figure 4A:
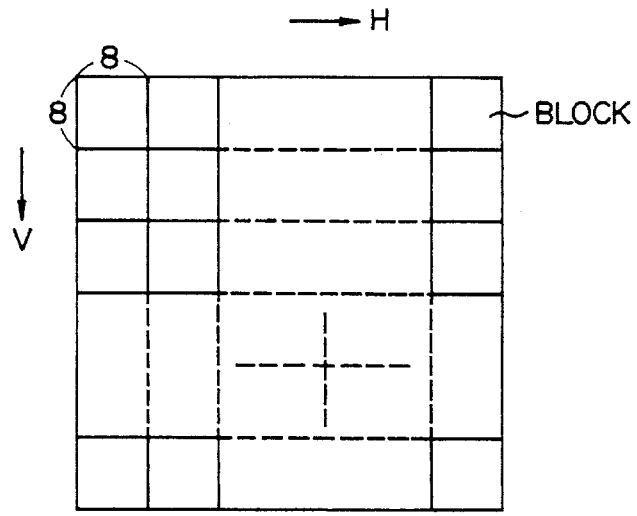
FIG. 4A illustrates how an image is divided.

Next, the operation of the high efficiency coding system 1 will be explained with reference to FIGS. 2 to 4C. In this example, assume that an image signal including previous, current and next image signals is inputted to the system 1 in frame units or field units. As shown in FIG. 4A, one field/frame of image signal has a plurality of blocks, each of which is composed of 8×8 pixels. One block of an inputted current image signal is supplied to the subtractor 51 and the controller 52. The controller 52 is also supplied with one block of a prediction error signal from the subtractor 51. The controller 52 compares the block of the current image signal with that of the prediction error signal, with respect to, for example, a power amount, and generates a mode signal indicating either one of an intra mode and an inter mode so as to improve the coding efficiency. FIGS. 3A and 3B illustrate the spatial power spectra of the current image signal and the prediction error signal, respectively. It can be seen that the power of the current image signal is concentrated onto the low frequency components of both the horizontal direction (μs represents a horizontal sampling frequency) and the vertical direction (vs represents a vertical sampling frequency). As to the prediction error signal, while a power concentration onto low frequency components is theoretically seen in the horizontal direction, such power concentration as in the current image signal is not present in the vertical direction.

If a large amount of low frequency components is present, there are few spatial changes of an image in a block, that is, the correlation between pixels is high, whereby a good coding efficiency is provided by the DCT processing. On the other hand, as a larger amount of high frequency components is present, it corresponds to more spatial variations in an image of a block, i.e., the correlation between pixels is low. In this case, the DCT processing for the prediction error signal in the vertical direction does not provide a good coding efficiency, so that the horizontal 1D-DCT processing is employed. Particularly, when inter-lace scanning is performed, the correlation between pixels in the vertical direction is decreased, whereby a high level high frequency component exists in the vertical direction, as shown in FIG. 3B. There are two modes: intra mode and inter mode. In intra mode, the 2D-DCT processing is performed and in the inter mode the horizontal 1D-DCT (1H-DCT) processing is performed in which the DCT processing is not performed in the vertical direction since the correlation is small in the vertical.

Figure 4B:
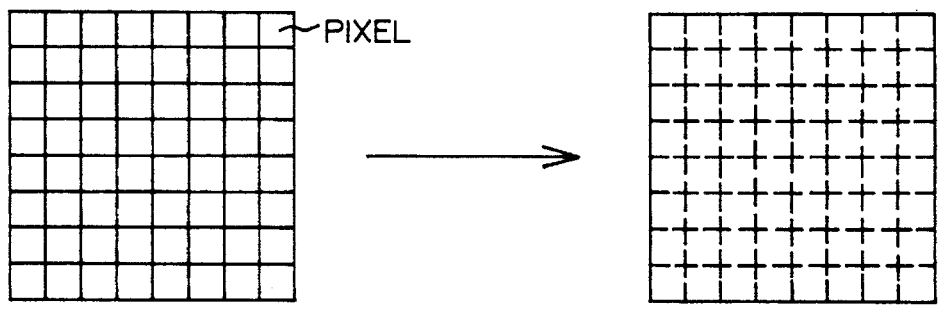
FIG. 4B illustrates how the two-dimensional discrete cosine transform (2D-DCT) is performed.

When the 2D-DCT processing is performed, an image signal goes through the 2D-DCT processing in block or 8×8 pixel units by the 2D-DCT circuit 22 of the two-dimensional processing section to generate transform coefficients, as shown in FIG. 4B. The quantizer (Q) 23 quantizes each transform coefficient with a predetermined weight to generate 64 quantization coefficients. The weight is previously determined based on the horizontal and vertical frequencies of the transform coefficient. The scanning circuit 24 reads the thus generated 64 quantization coefficients in the order conforming to a scanning path in a zigzag manner shown in FIG. 8A, for example, to generate a train of quantization coefficients.

Figure 4C:
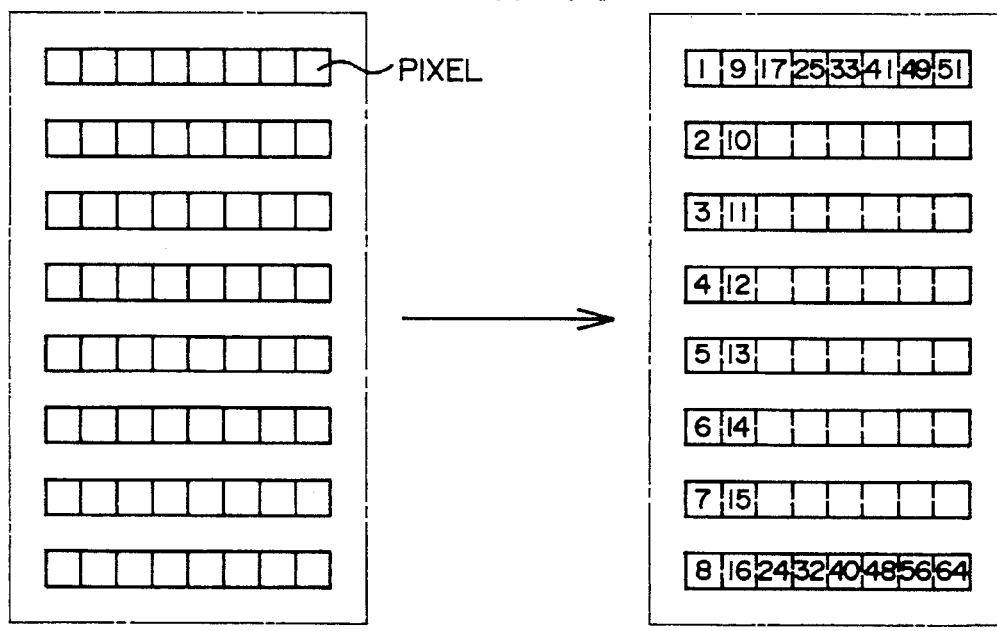
FIG. 4C illustrates how the one-dimensional discrete cosine transform (1D-DCT) is performed and a scanning path followed by a scanning circuit.

When the 1D-DCT processing is performed, a current block of a image signal is divided into eight 8×1 pixels sub-blocks in vertical direction, each of which goes through the 1D-DCT processing by the 1D-DCT circuit 12 to generate 64 transform coefficients for the whole block. The quantizer (Q) 13, similar to the circuit 23, quantizes the transform coefficients for each sub-block with corresponding weights to generate eight quantization coefficients. When eight sub-blocks have been processed in the vertical direction, the scanning circuit 14 reads the generated 64 quantization coefficients in the order conforming to a scanning path in the vertical direction, as shown in FIG. 4C, for example, to generate a train of quantization coefficients. In the scanning path shown in FIG. 8A, the horizontal frequency becomes higher from the coefficient at the upper left position toward the right while the vertical frequency becomes higher from the same coefficient toward the downward direction. In the scanning path shown in FIG. 4C, the horizontal frequency becomes higher from the coefficient at the left end toward the right. Quantization coefficients in an upper left portion is important in the 2D-DCT processing, while those in a left end portion is important in the 1D-DCT processing. Therefore, the weights applied to a lower right portion are set to be light in the 2D-DCT processing, and the weight applied to a right end portion is set to be light in the 1D-DCT processing. This processing allows quantization coefficients with light weights applied to be compressed efficiently. As a result, the quantization coefficients are read sequentially through the scanning path in the order of importance.

When the intra mode is set, the switches 31 and 53 connect the circuits 33 and 54 to the circuit 26 and 24, respectively, and the switch 32 is opened. When the inter mode is set, the switches 31 and 53 connect the circuits 33 and 54 to the circuits 16 and 14, respectively. The switch 32 is closed. The quantization coefficient train is supplied to the VLC 54 from the circuit 24 in the intra mode or from the circuit 14 from the inter mode. The mode signal is also supplied to the VLC 54. The VLC 54 converts the mode signal to a code word, thereby informing with which processing method a block was transformed. Subsequently, a code word is assigned to each coefficient in the quantization coefficient train. The mode signal may be encoded following the train. In this event, if coefficients equal to zero appear in succession, a single code word may be assigned to the number of coefficients of zero, thereby improving the compression ratio. The generated code words are transmitted through a transmission medium as a transmission signal. By performing the foregoing processing to each block of an image, one frame/field of image signal can be efficiently compressed and transmitted.

The quantization coefficients from the Q 23 are subjected to dequantization processing by the $Q^{-1}$ 25 and inverse 2D-DCT processing by the circuit 26 to reproduce a signal block substantially equal to the current block of the current image signal supplied to the circuit 22. The quantization coefficients from the Q 13 are subjected to dequantization processing by the $Q^{-1}$ 15 and inverse 1D-DCT processing by the circuit 16 to reproduce a signal block substantially equal to the current block of the prediction error signal supplied to the circuit 12. Since any signal is not supplied to the adder 33 through the switch 32 in the intra mode, the reproduced signal block is stored through the adder 33 into the predicting circuit 34 as a previous image signal block for the next image signal. In the inter mode, the adder 33 is supplied with the reproduced signal block from the circuit 16 through the switch 31 and a signal from the predicting circuit 34 through the switch 32 and adds both signals. As a result, the added signal is stored in the predicting circuit 34 as a previous image signal block for the next image signal. The predicting circuit 34 is supplied with the current image signal, performs, for example, a motion compensation prediction with the previous image signal, and supplies the prediction result to the subtractor 51 as a prediction signal, thereby making it possible to perform the above described processing to the next frame/field of the next image signal.

Figure 5:
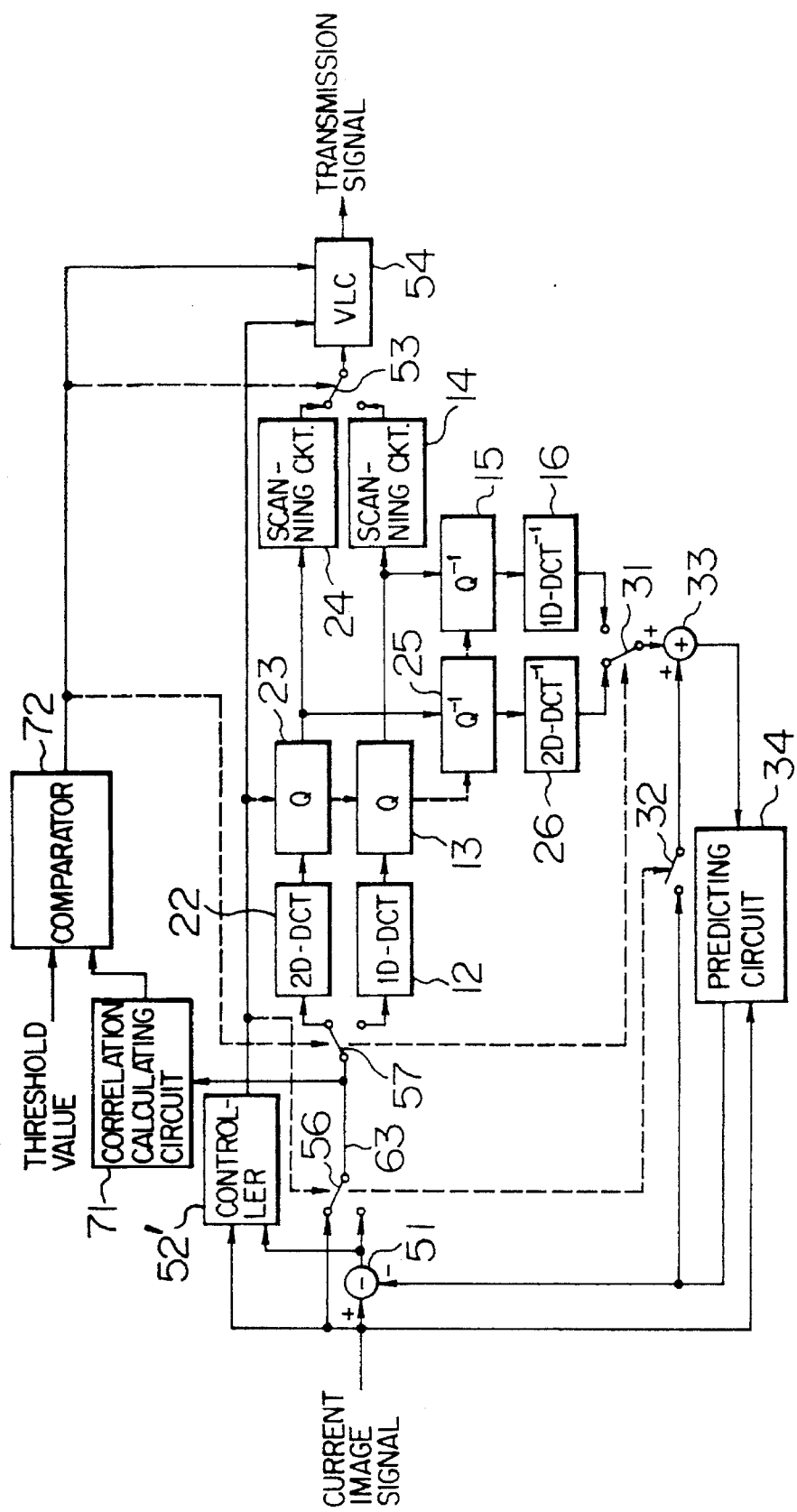
FIG. 5 illustrates another system for high efficiency coding of image signals.

Next, another example of the high efficiency coding system according to the present invention will be explained with reference to FIG. 5. In some image signals, a current image signal may occasionally have a high level high frequency component in the vertical direction while a prediction error signal may present a low level high frequency component in the vertical direction. To cope with such image signals, this example performs one-dimensional orthogonal transform processing or two-dimensional orthogonal transform processing based on the correlation between pixels in the vertical direction for one of a current image signal and a prediction error signal, specified as an objective image signal subjected to the processing. A high efficiency coding system according to this example will hereinafter be described, where the basic configuration is similar to that shown in FIG. 2 so that different points alone will be explained. A controller 52', though similar to the controller 52 shown in FIG. 2, does not supply a mode signal to switches 31 and 53 but to switches 32 and 56 and the quantizing circuits 13 and 23. The switch 56, responsive to the mode signal, selects one of the current image signal and prediction error signal as the objective image signal, and supplies the selected one to a switch 57 through a path 63. The system shown in FIG. 5 is additionally provided with a sub-control section. This sub-control section includes a correlation calculating circuit 71 and a comparator 72. The correlation calculating circuit 71 calculates the correlation between pixels in the vertical direction of the objective image signal. The comparator 72 compares the calculation result of the circuit 71 with a threshold value to generate a signal indicative of a sub-mode. The sub-mode includes a one-dimensional sub-mode and a two-dimensional sub-mode. The sub-mode signal is supplied to the switch 57. It is also supplied to the switches 31 and 53 in place of the mode signal in FIG. 2. The switch 57, in response to the sub-mode signal, selectively supplies the objective image signal to a one-dimensional processing section or a two-dimensional processing section. Each of the quantizing circuits 13 and 23 uses a different weight set in response to the mode signal. That is, the weight set in the inter mode is different from that in the intra mode. Thus, the circuits 15 and 25 are also changed in correspondence with the circuits 13 and 23. A quantization coefficient train generated by a selected processing section is supplied to the VLC 54 through the switch 53 to generate a transmission signal. The VLC 54 is also supplied, in addition to the quantization coefficient train, with the mode signal and the sub-mode signal which have been coded prior to the coding of the quantization coefficients train. The switch 31, under the control of the sub-mode signal, supplies the adder 33 with a reproduced signal from the circuit 16 in the one-dimensional sub-mode or from the circuit 26 in the two-dimensional sub-mode. The switch 32 is controlled by the mode signal so as to be opened in the intra mode and closed in the inter mode. Thus, the setting of the mode and the sub-mode enables more appropriate coding and reproduction processing.

Figure 6:
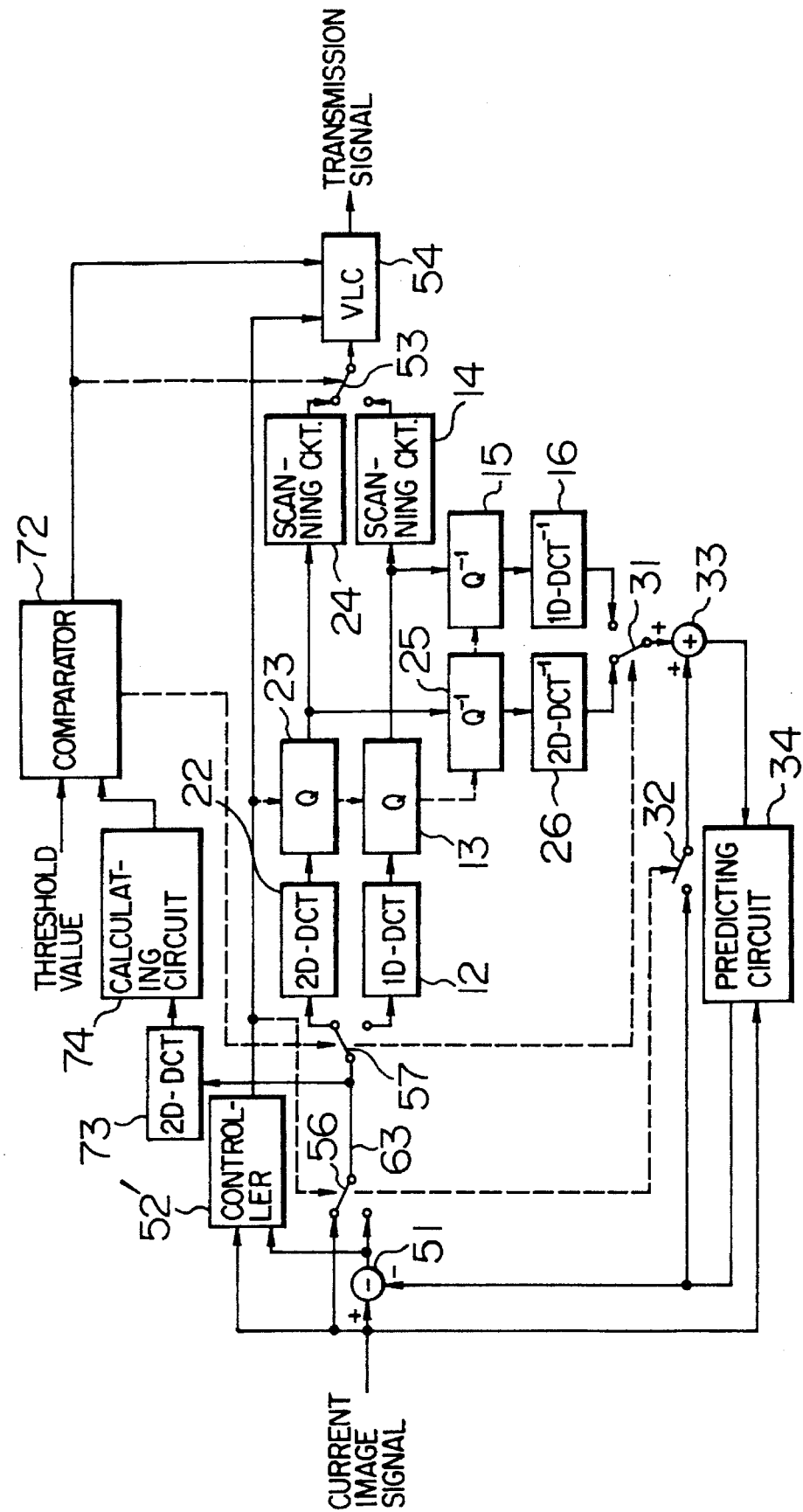
FIG. 6 illustrates a modified example of the high efficiency coding system shown in FIG. 5.

FIG. 6 illustrates a modified example of the high efficiency coding system shown in FIG. 5. In this example, the sub-control section includes a two-dimensional discrete cosine transform (2D-DCT) circuit 73, a calculating circuit 74 and a comparator 72. The circuit 73 performs 2D-DCT processing for an objective image signal to generate coefficients. Each generated coefficient is squared by the calculating circuit 74. The squared coefficients are grouped into a high frequency component and a low frequency component in the vertical direction and accumulated to calculate a ratio of an accumulated value for the low frequency component to an accumulated value for the high frequency component. The derived ratio is supplied to the comparator 72 to be compared with a threshold value. A sub-mode signal is generated based on the comparison result. The rest of the operation of this system is similar to that of the system shown in FIG. 5, so that explanation thereof will be omitted.

Figure 7:
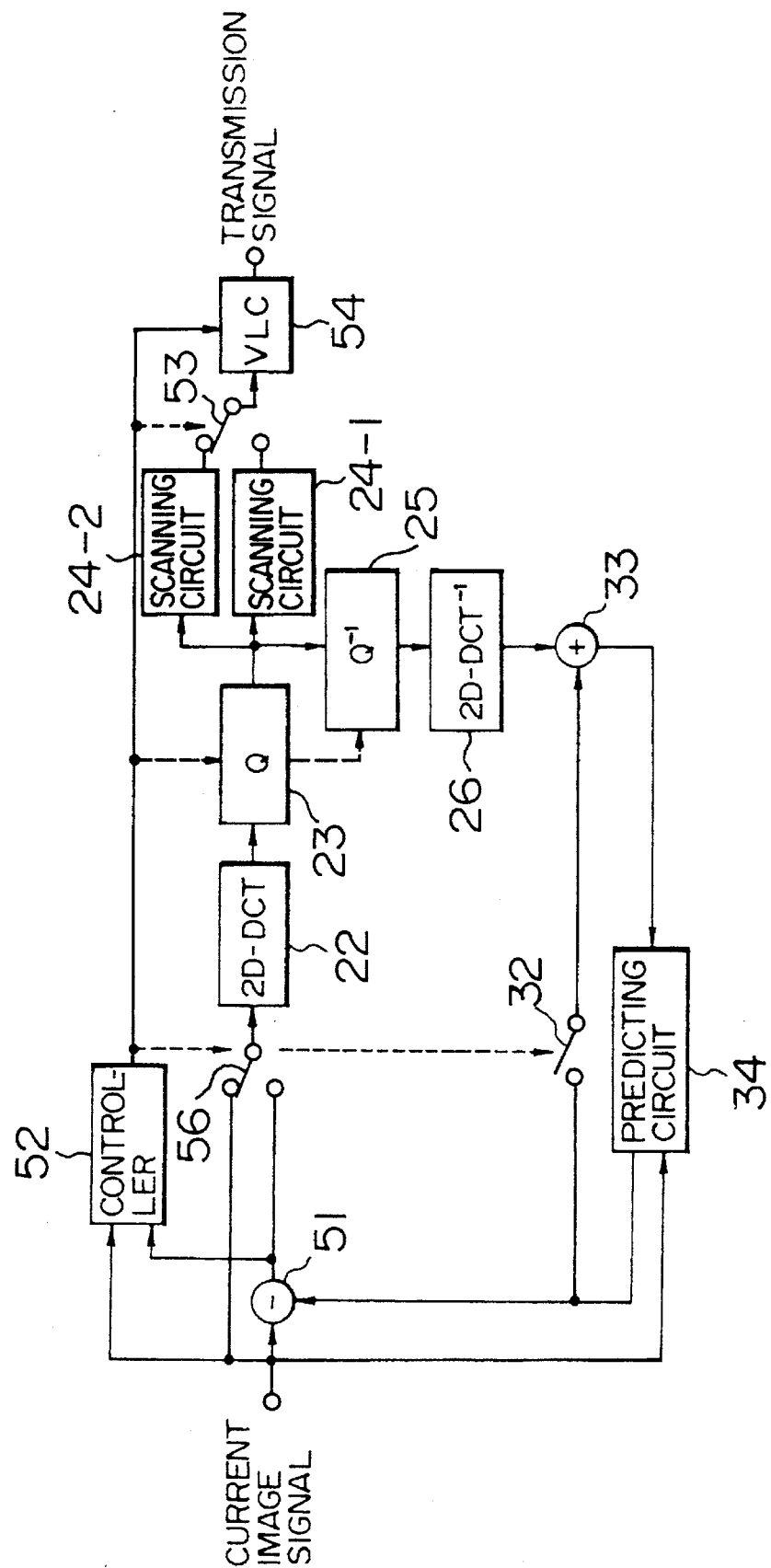
FIG. 7 illustrates a further system for high efficiency coding of an image signal.

FIG. 7 illustrates another example of the high efficiency coding system according to the present invention. In this example, different scanning paths are employed for coding a current image signal and for coding a prediction error signal. Explanation given below is directed to different points as compared with the high efficiency coding system shown in FIG. 2. In this example, a processing section is not provided with a one-dimensional processing section but only with a two-dimensional processing section. One of a current image signal and a prediction error signal is selectively supplied to the processing section. Specifically, the two-dimensional processing section is supplied with the current image signal when the intra mode is set by the controller 52 and with a prediction error signal when the inter mode is set by the same. The two-dimensional processing section includes two scanning circuits 24-1 and 24-2 in each of which a different scanning path is defined. The quantizing circuit 23 has two weight sets for the intra and inter modes, respectively. Thus, the $Q^{-1}$ has inverse numbers of weights of the circuit 23. The circuit 23 selects one of the two weight sets in response to the mode signal. The switch 53 is controlled by a mode signal from the controller 52 to supply the VLC 54 with a quantization coefficient train from the circuit 24-2 in the intra mode or a quantization coefficient train from the circuit 24-1 in the inter mode. The circuit 24-2 reads the quantization coefficient train conforming to the scanning path in a zigzag manner shown in FIG. 8A. The circuit 24-1 reads the quantization coefficient train conforming to a scanning path which attaches importance to the vertical direction, as shown in FIG. 8B. This is because the current image signal has power concentrated relatively on a low frequency region as shown in FIG. 3A while power of the prediction error signal is not concentrated on a low frequency region in the vertical direction but entirely distributed.

Figure 9:
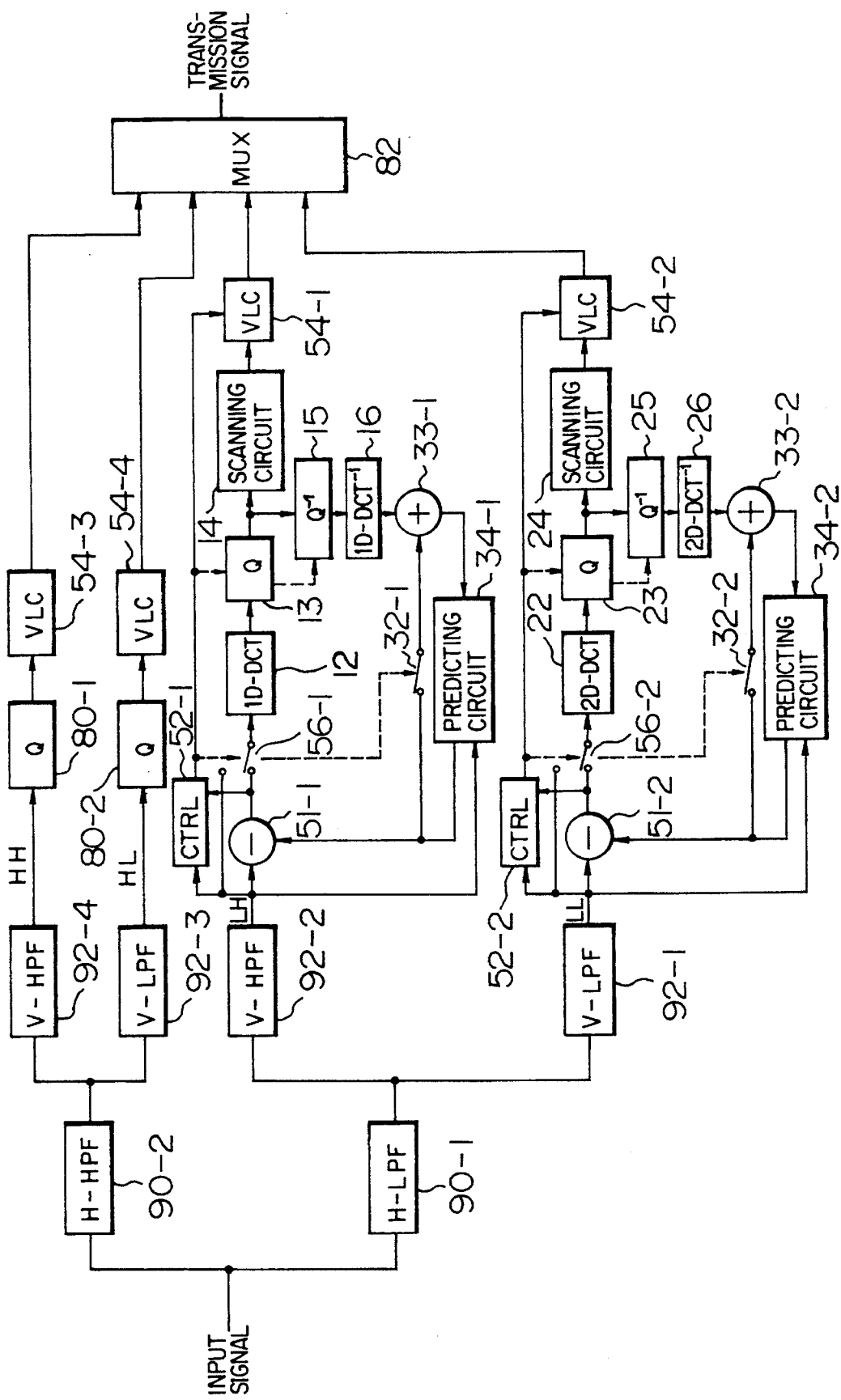
FIG. 9 illustrates a system for high efficiency coding of an image signal according to the present invention which employs the band division.

A high efficiency coding system for an image signal shown in FIG. 9 is an example which employs a different coding system to each frequency component. An input signal is separated into two frequency components, i.e., a horizontal high frequency component and a horizontal low frequency component by a horizontal low pass filter (H-LPF) 90-1 and a horizontal high pass filter (H-HPF) 90-2. The horizontal high frequency component and the horizontal low frequency component are further separated into a vertical high frequency component and a vertical low frequency component by vertical low pass filters (H-LPF) 92-1, 92-3 and vertical high pass filters (H-HPF) 92-2, 92-4. Stated another way, an input signal is separated into four components, i.e., a horizontal high frequency and vertical high frequency component HH; a horizontal high frequency and vertical low frequency component HL; a horizontal low frequency and vertical high frequency component LH; and a horizontal low frequency and vertical low frequency component LL. The input signal may be separated in another manner. The frequency components HH and HL are directly quantized respectively by quantizers 80-1 and 80-2 with respective predetermined weights, without being subjected to orthogonal transform and coded by VLCs 54-3 and 54-4, respectively. The frequency components LH are coded by utilizing motion compensation prediction and horizontal one-dimensional orthogonal transform. In other words, in the coding system shown in FIG. 5, a portion associated with the one-dimensional sub-mode is employed. More specifically, such a portion of FIG. 5 includes the subtractor 51-1, the controller 52-1; the switches 56-1 and 32-1; the one-dimensional discrete cosine transform (1D-DCT) circuit 12; the quantizer (Q) 13; the scanning circuit 14; the VLC 54-1; the dequantization processing circuit ($Q^{-1}$) 15; the inverse 1D-DCT processing (1D-DCT$^{-1}$) circuit 16; the adder 33-1; and the predicting circuit 34-1. The operations of these components will be readily understood by those skilled in the art from the operation of the coding system shown in FIG. 5. Frequency components LL is coded by utilizing motion compensation prediction and two-dimensional orthogonal transform. In other words, a portion associated with the two-dimensional sub-mode is employed in the coding system shown in FIG. 5. More specifically, a corresponding portion of FIG. 5 includes the subtractor 51-2; the controller 52-2; the switches 56-2 and 32-2; the two-dimensional discrete cosine transform (2D-DCT) circuit 22; the quantizer (Q) 23; the scanning circuit 24; the VLC 54-2; the dequantization processing circuit ($Q^{-1}$) 25; the inverse 2D-DCT processing (2D-DCT$^{-1}$) circuit 26; the adder 33-2; and the predicting circuit 34-2. The operations of these components will be readily understood by those skilled in the art from the operation of the coding system shown in FIG. 5. Code words from VLCs 54-1 to 54-4 are multiplexed by a MUX in the previously determined order and outputted to a transmission medium as a transmission signal.

Figure 10:
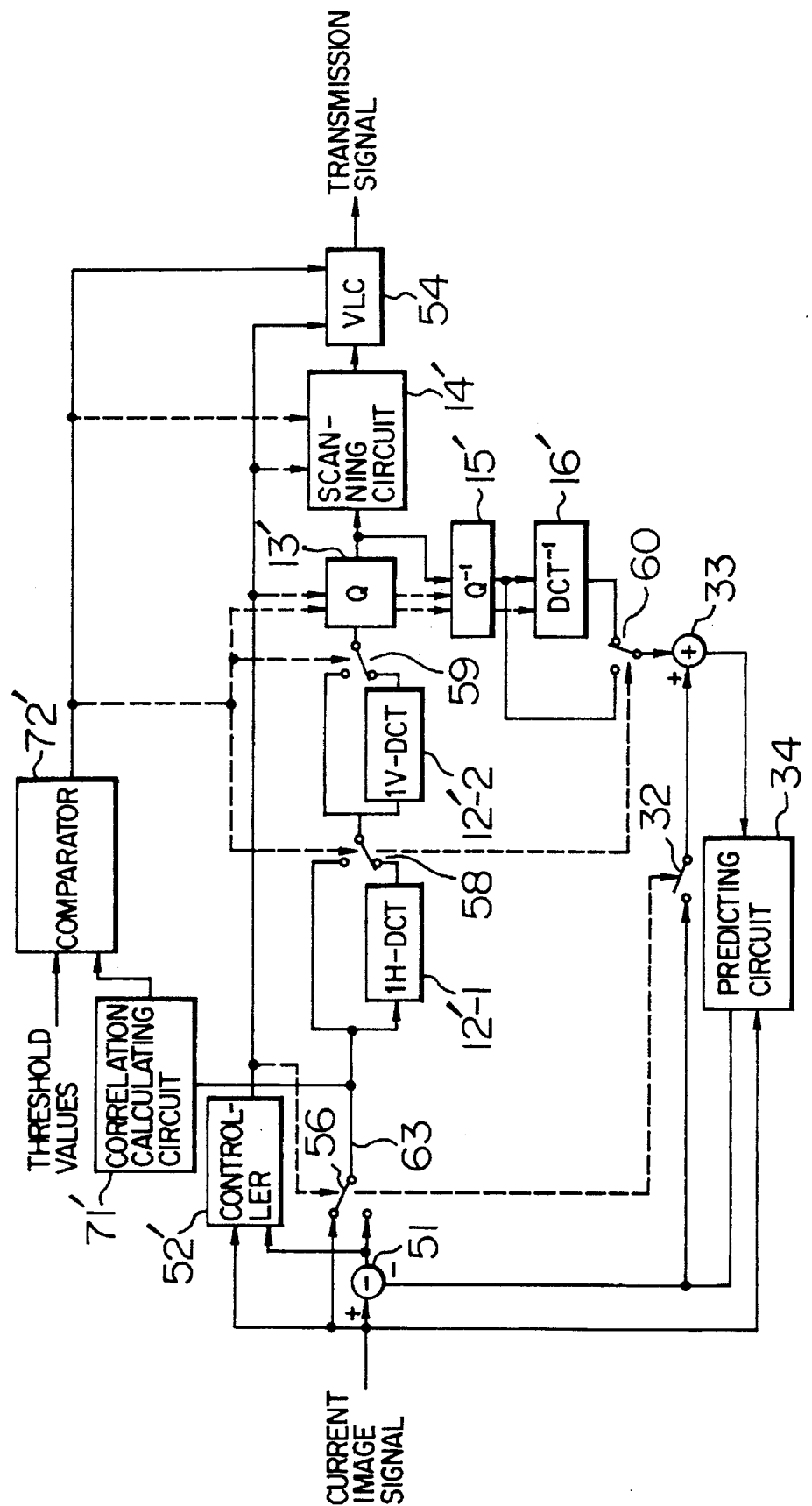
FIG. 10 illustrates another example of the high efficiency coding system of the present invention.

Next, another example of a high efficiency coding system of the present invention will be described with reference to FIG. 10. This example is basically similar to that shown in FIG. 5. Therefore, only different points will be described. The controller 52' generates a mode signal indicating either one of the intra mode and the inter mode and supplies the same to the switch 56, the quantizing circuit 13', the dequantizing circuit 15', and the scanning circuit 14'. The correlation calculating circuit 71' receives the objective image signal and calculates correlations between pixels in horizontal and vertical directions to supply the calculated results to the comparator 72'. The comparator 72' receives two threshold values for horizontal and vertical directions which are compared with outputs from the circuit 71' and generates a sub-mode signal indicating either one of a two-dimensional sub-mode, a one-dimensional horizontal sub-mode, a one-dimensional vertical sub-mode and a zero-dimensional sub-mode. The sub-mode signal is supplied to switches 58, 59 and 60, and the quantizing circuit 13', the dequantizing circuit 15', the inverse processing circuit of the DCT 16' and the scanning circuit 14'. The current image signal and the prediction image signal from the subtractor 51 are supplied to the switch 56 to output one of them as the objective image signal to the processing section. The processing section includes a circuit 12'-1 for one-dimensional orthogonal transform such as the DCT in the horizontal direction, a circuit 12'-2 for one-dimensional orthogonal transform such as the DCT in the vertical direction and switches 58 and 59. The processing section can be realized by use of a device similar to the TMC2311 from TRW LSI Products Inc. The circuit (1H-DCT) 12'-1 is disposed between the switches 56 and 58 and the circuit (1V-DCT) 12'-2 is disposed between the switches 58 and 59. The switches operates in response to the sub-mode signal such that: the objective image signal is transformed by the circuits 12'-1 and 12'-2 in the two-dimensional sub-mode, it is transformed by the circuit 12'-1 with the circuit 12'-2 by-passed in the one-dimensional horizontal sub-mode, it is transformed by the circuit 12'-2 with the circuit 12'-1 by-passed in the one-dimensional vertical sub-mode, and it is not transformed with the circuits 12'-1 and 12'-2 by-passed in the zero-dimensional sub-mode. The quantizing circuit 13' has eight weight sets for eight modes determined by the mode signal and the sub-mode signal. The dequantizing circuit 15' is disposed in correspondence with the circuit 13'. Also, the scanning circuit 14' has eight scanning paths for the eight modes. The output from the circuit 14' is encoded by the VLC 54 together with the mode signal and the sub-mode signal to be transmitted onto the transfer media as the transmission signal. The switch 60 connects the adder 33 to the dequantizing circuit 15' in the zero-dimensional sub-mode and to the circuit 16' in the other sub-modes. The remaining portion of the reproducing section is similar to that shown in FIG. 5.

While conventional high efficiency coding systems can efficiently code an input image signal with a high correlation between pixels, it presents problems, when the correlation between pixels is small, that it does not contribute to improving the coding efficiency and moreover deterioration in image quality such as mosquito noise, inherent to the DCT system, alone is conspicuous on the contrary. However, according to the present invention, the two-dimensional orthogonal transform is applied or not applied in accordance with the properties of different images by switching the mode and sub-mode, thereby achieving appropriate coding to the property of each image. This scheme also makes the coding efficiency compatible with the improvement of image quality.

What is claimed is:

1. A system for performing high efficiency coding of an image signal comprising:

a differential signal generating means for generating a differential image signal from a current image signal inputted thereto and a prediction image signal inputted thereto for said current image signal, with respect to a target block, images of said current image signal and said differential image signal each comprising a plurality of blocks and said target block being one of said plurality of blocks;

a control means for generating a mode signal indicative of either one of an intra mode and an inter mode based on a result of a comparison of said current image signal inputted thereto and said differential image signal from said differential signal generating means with respect to said target block;

a coefficient train outputting means responsive to said mode signal, for generating as a train of quantization coefficients representative of said target block, a train of a one-dimensional orthogonal transformation (1D-OT) quantized coefficients for said differential image signal from said differential signal generating means in the inter mode and a train of a two-dimensional orthogonal transformation (1D-OT) quantized coefficients for said current image signal inputted thereto in the intra mode; and a code assigning means for assigning a code to each quantization coefficient of said train of quantization coefficients from said coefficient train outputting means to generate a transmission signal representative of said target block.

2. A system according to claim 1, wherein said target block comprises a plurality of sub-blocks and said coefficient train outputting means includes a means for performing 1D-OT processing for each of said sub-blocks of said target block.

3. A system according to claim 1, wherein said coefficient train outputting means includes a means for performing 1D-OT processing for said differential image signal and a means for performing 2D-OT processing for said current image signal, and said 1D-OT processing and said 2D-OT processing are a one-dimensional discrete cosine transform (1D-DCT) processing and a two-dimensional discrete cosine transform (2D-DCT) processing, respectively.

4. A system according to claim 1, wherein said coefficient train outputting means comprises:

a means for executing 1D-OT processing and first quantization processing for said differential image signal with respect to said target block to generate said train of 1D-OT quantized coefficients;

a means for executing 2D-OT processing and second quantization processing for said current image signal with respect to said target block to generate said train of 2D-OT quantized coefficients; and a means responsive to said mode signal, for selecting as said train of quantization coefficients one of said trains of 1D-OT and 2D-OT quantized coefficients.

5. A system according to claim 1, wherein said coefficient train outputting means comprises:

a first coefficient means for executing 1D-OT processing and then first quantization processing for said differential image signal with respect to said target block to generate said train of 1D-OT quantized coefficients;

a second coefficient means for executing 2D-OT processing and then second quantization processing for said current image signal with respect to said target block to generate said train of 2D-OT quantized coefficients; and a means responsive to said mode signal, for selectively activating either one of said first and second coefficient means to output as said train of quantization coefficients one of said trains of 1D-OT and 2D-OT quantized coefficients.

6. A system according to claim 1, wherein said current image signal and said prediction image signal both are signals in a unit of frame or field.

7. A system according to claim 1, further comprising a means for selectively generating a next prediction image signal for a next image signal from an image signal reproduced from said 1D-OT quantized coefficients and said prediction image signal for said current image signal in said inter mode, and generating said next prediction image signal from said 2D-OT quantized coefficients in said intra mode.

8. A system for performing high efficiency coding of an image signal comprising:

a differential signal generating means for generating a differential image signal from a current image signal inputted thereto and a reference image signal inputted thereto for said current image signal, with respect to a target block, images of said current image signal and said differential image signal each comprising a plurality of blocks, and said target block being one of said plurality of blocks;

a first control means for generating a mode signal selectively indicative of one of an intra mode and an inter mode based on a result of a comparison of said current image signal and said differential image signal with respect to said target block, and for selecting said current image signal in said intra mode and said differential image signal in said inter mode as an objective image signal;

a second control means for generating a sub-mode signal selectively indicative of one of a one-dimensional (1D) sub-mode and a two-dimensional (2D) sub-mode based on a power spectrum of said objective image signal;

a coefficient train outputting means responsive to said sub-mode signal, for selectively generating as a train of quantization coefficients one of a train of one-dimensional orthogonal transformation (1D-OT) quantized coefficients and a train of two-dimensional orthogonal transformation (2D-OT) quantized coefficients for said objective image signal; and a code assigning means for assigning a code to each quantization coefficient of said train of quantization coefficients from said coefficient train outputting means to generate a transmission signal.

9. A system according to claim 8, wherein said target block comprises a plurality of sub-blocks and said coefficient train outputting means includes a means for performing 1D-OT processing for each of said sub-blocks.

10. A system according to claim 8, wherein said second control means comprises:

a means for detecting a correlation in a vertical direction between pixels of said objective image signal with respect to said target block; and a means for comparing a detected correlation from said means for detecting and a predetermined threshold value and generating said sub-mode signal based on a comparison result.

11. A system according to claim 8, wherein said second control means comprises:

a means for performing a 2D-OT processing for said objective image signal with respect to said target block to generate orthogonal transform coefficients;

a calculating means for calculating a ratio of one of a sum of squared values and absolute values of a high frequency portion of said orthogonal transform coefficients in a vertical direction to one of a sum of squared values and absolute values of a low frequency portion of said orthogonal transform coefficients in said vertical direction; and a means for comparing a calculated ratio from said calculating means with a predetermined threshold value and generating said sub-mode signal based on a comparison result.

12. A system according to claim 8, wherein said coefficient train outputting means includes a means for performing at least one of a 1D-OT and 2D-OT processing for said objective image signal, and said 1D-OT processing and said 2D-OT processing are one-dimensional discrete cosine transform (1D-DCT) processing and two-dimensional discrete cosine transform (2D-DCT) processing, respectively.

13. A system according to claim 8, wherein said coefficient train outputting means comprises:

a first processing means for executing 1D-OT processing and first quantization processing for said objective image signal with respect to said target block to generate said train of 1D-OT quantized coefficients;

a second processing means for executing 2D-OT processing and second quantization processing for said objective image signal with respect to said target block, to generate said train of 2D-OT quantized coefficients; and a means responsive to said sub-mode signal, for selecting and supplying to said code assigning means as said train of quantization coefficients, said train of 1D-OT quantized coefficients from said first processing means in said 1D sub-mode and said 2D-OT quantized coefficients train from said second processing means in said 2D sub-mode.

14. A system according to claim 13, wherein said current image signal and said reference image signal both are signals in a unit of frame or field.

15. A system according to claim 14, further comprising a reproducing means for forming a reproduced signal from one of said train of 1D-OT quantized coefficients outputted from said first processing means in said 1D sub-mode and said train of 2D-OT quantized coefficients from said second processing means in said 2D sub-mode, generating said reproduced signal as a next reference image signal for a next image signal in said intra mode, and generating said next reference image signal for said next image signal from said reproduced signal and an image signal corresponding to said current image signal in said inter mode.

16. A system according to claim 15, wherein said reproducing means includes a means for selectively performing, upon generating said next reference image signal for said next image signal, one of an inter-frame prediction and an inter-field prediction and selectively performing motion compensation prediction in addition to said one of said inter-frame and inter-field prediction.

17. A system for performing high efficiency coding of an image signal, comprising:

a one-dimensional horizontal processing means for performing a one-dimensional horizontal orthogonal transform;

a one-dimensional vertical processing means for performing a one-dimensional vertical orthogonal transform;

a sub-mode means for generating a sub-mode signal indicative of one of a two-dimensional mode, a one-dimensional horizontal mode, a one-dimensional vertical mode and a zero-dimensional mode based on correlations in horizontal and vertical directions between pixels of an objective image signal inputted thereto;

an activating means responsive to said sub-mode signal for selectively activating each of said one-dimensional horizontal processing means and said one-dimensional vertical processing means for said objective image signal to generate a processed signal;

a quantizing means for quantizing said processed signal to generate quantization coefficients;

a coefficient train outputting means for generating and outputting a coefficient train from said quantization coefficients; and code assigning means for assigning a code for each quantization coefficient of said coefficient train to generate a transmission signal.

18. A system for performing high efficiency coding of a video signal comprising:

a dividing means for dividing an inputted video signal into at least four signal components including first to fourth video signal components based on frequency components in vertical and horizontal directions, wherein said first video signal component has a high horizontal frequency component and a high vertical frequency component, said second video signal component has a high horizontal frequency component and a low vertical frequency component, said third video signal component has a low horizontal frequency component and a high vertical frequency component, and said fourth video signal component has a low horizontal frequency component and a low vertical frequency component;

a means for performing a quantization processing for said first video signal component, and coding a result of said quantization processing to generate a first code train which includes codes representing said first video signal component;

a means for performing a quantization processing for said second video signal component, and coding a result of said quantization processing to generate a second code train which includes codes representing said second video signal component;

a means for performing processing of a motion compensation prediction and a horizontal one-dimensional discrete cosine transform (1D-DCT) for said third video signal component, performing a quantization processing for a processing result, and coding results of said quantization processing to generate a third code train which includes codes representing said third video signal component;

a means for performing processing of a motion compensation prediction and a two-dimensional discrete cosine transform (1D-DCT) for said fourth video signal component, performing a quantization processing for a processing result, and coding a result of said quantization processing to generate a fourth code train which includes codes representing said fourth video signal component; and an outputting means for outputting said first to fourth code trains in a predetermined order.

19. A system for performing high efficiency coding of a video signal comprising:

a dividing means for dividing an inputted video signal into partial signals based on frequencies in vertical and horizontal directions;

a means for selectively performing a quantization processing on a first partial signal group of said partial signals and coding a result of said quantization processing to generate a first code train;

a means for selectively performing processing of a motion compensation prediction and a horizontal one-dimensional discrete cosine transform (1D-DCT) for a second partial signal group of said partial signals, performing a quantization processing for processing results, and coding a result of said quantization processing to generate a second code train;

a means for selectively performing processing of a motion compensation prediction and a two-dimensional discrete cosine transform (2D-DCT) for a third partial signal group of said partial signals, performing a quantization processing for a processing result, and coding a result of said quantization processing to generate a third code train; and means for outputting said first to third code trains in a predetermined order.

20. A method of highly efficiently coding image signals comprising the steps of:

generating a differential image signal from a current image signal and a prediction image signal for said current image signal with respect to a target block, said current image signal and said differential image signal each comprising a plurality of blocks and said target block being one of said plurality of blocks;

selectively performing one of one-dimensional orthogonal transform (1D-OT) processing and first quantization processing for an objective image signal which is produced from said differential image signal in an inter mode or said current image signal in an intra mode and two-dimensional orthogonal transform (2D-OT) processing and second quantization processing for the objective image signal to generate quantization coefficients;

generating a quantization coefficient string from said quantization coefficients;

assigning a code to each quantization coefficient of said quantization coefficient string to generate a transmission signal;

detecting a correlation between pixels in a vertical direction of said objective image signal;

determining whether or not a detected correlation is larger than a predetermined value; and when said detected correlation is determined to be larger than said predetermined value, performing two-dimensional orthogonal transform (2D-OT) processing and second quantization processing for said objective image signal, in place of said 1D-OT processing and said first quantization processing, to generate said quantization coefficients.

21. A method according to claim 20, wherein said step of selectively performing 1D-OT processing comprises the steps of:

comparing signal power between said current image signal and said differential image signal with respect to said target block; and when said signal power of said differential image signal is determined to be less than a signal power of said current image signal, performing said 1D-OT processing and said first quantization for said differential image signal to generate said quantization coefficients.

22. A system for performing high efficiency coding of an image signal comprising:

a differential signal generating means for generating a differential image signal from a current image signal inputted thereto and a prediction image signal inputted thereto for said current image signal with respect to a target block, said current image signal and said differential image signal each comprising a plurality of blocks and said target block being one of said plurality of blocks;

a one-dimensional processing means for executing processing of a one-dimensional orthogonal transform and a first quantization for an inputted objective image signal, with respect to said target block in an inter mode, to generate a processing result as quantization coefficients;

a two-dimensional processing means for executing processing of a two-dimensional orthogonal transform and a second quantization for said objective image signal inputted thereto, with respect to said target block in an intra mode, to generate a processing result as said quantization coefficients;

a supply means for supplying one of said one-dimensional processing means in an inter mode and said two-dimensional processing means in an intra mode with said differential image signal as said objective image signal with respect to said target block;

a coefficient train outputting means for generating a quantization coefficient train from said quantization coefficients;

a code assigning means for assigning a code to each quantization coefficient of said quantization coefficient train to generate a transmission signal;

a two-dimensional processing means for executing processing of a two-dimensional orthogonal transform and a second quantization for said objective image signal inputted thereto, with respect to said target block in an intra mode, to generate a processing result as said quantization coefficients;

a mode means for comparing said current image signal with said differential image signal and selectively setting one of said intra mode and inter mode based on a comparison result; and a supply means for outputting to said coefficient train outputting means, said quantization coefficients from said two-dimensional processing means in said intra mode, in place of said quantization coefficients from said one-dimensional processing means, and wherein said supply means further comprises means for supplying said two dimensional processing means with said current image signal as said objective image signal with respect to said target block in said intra mode.

23. A system according to claim 23, further comprising:

a mode means for comparing said current image signal with said differential image signal and selectively setting one of said intra mode and said inter mode based on a comparison result;

means for outputting said quantization coefficients from said two-dimensional processing means to said coefficient train outputting means in said inter mode in place of said quantization coefficients from said one-dimensional processing means.

24. A system for performing high efficiency coding of an image signal comprising:

a differential signal generating means for generating a differential image signal from a current image signal inputted thereto and a prediction image signal inputted thereto for said current image signal with respect to a target block, said current image signal and said differential image signal each comprising a plurality of blocks and said target block being one of said plurality of blocks;

a one-dimensional processing means for executing processing of a one-dimensional orthogonal transform and a first quantization for an inputted objective image signal, with respect to said target block in an inter mode, to generate a processing result as quantization coefficients;

a two-dimensional processing means for executing processing of a two-dimensional orthogonal transform and a second quantization for said objective image signal inputted thereto, with respect to said target block in an intra mode, to generate a processing result as said quantization coefficients;

a supply means for supplying one of said one-dimensional processing means and said two-dimensional processing means with said differential image signal as said objective image signal with respect to said target block;

a coefficient train outputting means for generating a quantization coefficient train from said quantization coefficients;

a code assigning means for assigning a code to each quantization coefficient of said quantization coefficient train to generate a transmission signal;

a mode means for comparing said current image signal with said differential image signal and selectively setting one of said intra mode and said inter mode based on a comparison result; and a sub-mode means for selectively setting one of a one-dimensional sub-mode and a two-dimensional sub-mode based on a characteristic of said objective image signal in a vertical direction, and wherein said supply means includes:

a means for supplying said one-dimensional processing means with said differential image signal as said objective image signal with respect to said target block in a one-dimensional mode of said inter mode.

25. A system according to claim 24, further comprising:

a means for outputting to said coefficient train outputting means, said quantization coefficients from said two-dimensional processing means in place of said quantization coefficients from said one-dimensional processing means; and wherein said supply means further comprises means for supplying said two-dimensional processing means with said differential image signal as said objective image signal with respect to said target block, in a two-dimensional sub-mode of said inter mode.

26. A system according to claim 24, wherein said supply means further comprises:

a means for supplying said one-dimensional processing means with said current image signal as said objective image signal, with respect to said target block, in a one-dimensional sub-mode of said inter mode.

27. A system according to claim 24, further comprising:

a means for outputting to said coefficient train outputting means, said quantization coefficients from said two-dimensional processing means, in place of said quantization coefficients from said one-dimensional processing means, in a two-dimensional sub-mode of said intra mode, and wherein said supply means further comprises:

a means for supplying said two-dimensional processing means with said current image signal as said objective image signal, with respect to said target block, in said two-dimensional sub-mode of said intra mode.

\* \* \* \* \*